Patented Feb. 15, 1949

2,461,564

UNITED STATES PATENT OFFICE 2,461,564

PROCESS OF PREPARING OIL-ACID MODIFIED ALKYD MATERIAL

Charles G. Moore, River Forest, Ill., assignor to The Glidden Company, Cleveland, Ohio, a corporation of Ohio No Drawing. Application June 8, 1945, Serial No. 598,405

5 Claims. (Cl. 260—22)

1

The present invention relates to synthetic resinous materials and particularly relates to the preparation of oil modified maleic type alkyd resins of low acid number.

The use of maleic anhydride or acid in conjunction with drying or semi-drying oils and synthetic resins used in the preparation of varnishes and enamels is not new. The use of this acid or anhydride became of considerable importance for the reason that it tended to produce a harder and more dense film as well as diminishing the amount of after yellowing in these clear varnishes and enamels.

Probably the first extensive use of glycerin and maleic anhydride resins was the preparation of the maleic modified ester gum. In this product glycerin, maleic anhydride and/or acid, together with rosin are reacted together to produce a hard brittle resin of low acid number, high melting point and very pale in color. This resin has been used for a number of years in the production of various varnishes used as such, or to produce white pigmented enamels. These varnishes or enamels containing maleic modified ester gum dried to a hard durable finish which exhibited very little tendency towards after yellowing when exposed to the light.

Another use for maleic anhydride in the paint and varnish industry has been accomplished by Carleton Ellis by reacting maleic anhydride together with a drying or semi-drying oil in a manner identical to that used in the Diels-Alder reaction.

In the early patent literature it was claimed that maleic anhydride could be substituted for pythalic anhydride in the manufacture of alkyd resins. It was later shown that this claim could not be substantiated, the reason being that when maleic acid or anhydride, glycerin, and oil fatty acids are reacted together in the usual manner the maleic anhydride and the glycerin combine and form a separate layer which is absolutely immiscible with the fatty acids and the balance of the glycerin. If the heating is continued the mass still shows two layers and finally the portion containing the maleic anhydride and glycerin gels and chars leaving the other layer containing the free portion of combined fatty acid and glycerin still in the liquid state. The explanation for this action is that polymerization takes place more rapidly than esterification with the result that an insoluble gel is produced before sufficient esterification takes place.

Rosenblum in United States Patent No. 2,063,854 has produced a resin from glycerin, maleic anhydride, and oil fatty acids. However, he has found that it is necessary first to react the glycerin and fatty acids together in the absence of maleic acid or anhydride until a di-glyceride of low acid number is obtained. He then introduces maleic anhydride to react with the balance of the free hydroxyl groups. He states in this patent that when this same general type of reaction is carried out with the monoglyceride it is impossible to produce a product with an acid number below 80–100. In this connection the product described by Rosenblum with an acid number of 80–100 is not miscible with other oils and is insoluble in petroleum solvents.

The present invention contemplates the preparation of a resin by heating together a drying or semi-drying oil fatty acid together with an equimolecular quantity of glycerine in the presence of a drying or semi-drying oil until the reaction between the glycerine and fatty acid is at least about 54% complete. An equimolecular amount of maleic anhydride is then added, after which the mixture may either be heated to further reduce the acid number, or may be cooled and stored for use. This results in a dispersion of the resinous product of maleic anhydride and monoglyceride in the oil and gives a product of considerably lower acid number that may be obtained when only the monoglyceride and maleic anhydride are reacted together in the manner customary in the prior art. This dispersion of resinous material in the oil may then be mixed with other oils and resins and cooked in varnishes in the regular manner well known in the art.

There are several methods of carrying out this operation, two of which we have found to be most suitable:

(1) One mol of oil acids together with one mol of glycerin and a suitable amount of drying or semi-drying oil such as soya oil, linseed, dehydrated castor oil, sun flower, rubber seed, safflower or fish oil, are heated together at a relatively high temperature, such as about 450° F., with good agitation, and if desired, in an atmosphere of carbon dioxide or nitrogen, and held at this temperature for about fifteen minutes or longer until the reaction is at least about 54% complete as shown by the acid number. The temperature of the material is then reduced to about 350° to 420° F., depending on the amount or type of oil used as a dispersing agent for the resin, and one mol of maleic anhydride is added. The material may then be cooled to room temperature or, if desired, heated further at a suitable temperature to produce a product of desired acid number, viscosity, etc.

(2) In the second method one mol of oil fatty acids are heated together with one mol of glycerin in the presence of a drying or semi-drying oil at a relatively lower temperature of say about 400° F. The heating is continued until the acid number has been reduced to the value calculated to give the desired degree of reaction, then the maleic anhydride is added and the heating continued at this temperature or higher or lower as may be desired.

It is to be understood that throughout this process good agitation should be employed, but the use of an inert atmosphere is optional.

We have found that these oils are perfectly miscible with other drying or semi-drying oils such as China-wood, perilla, linseed, oiticica and other drying and semi-drying oils. Most resins generally used in varnish manufacture may be used with these oils to produce varnishes having excellent drying properties and good color retention and excellent out-door durability and weather resistance, comparable to corresponding varnishes prepared from China-wood oil. In general they may be used either clear or pigmented.

The oils made by either of the above described methods may also be used in the preparation of vehicles for inks and for coating purposes in general. The methods used in the preparation of these oils is further detailed by the following concrete examples:

Example 1

| | Grams |
|---|---|
| Linseed oil fatty acids | 316 |
| 95% glycerin | 110 |
| Linseed oil | 300 |
| Maleic anhydride | 106 |

The linseed oil fatty acids, glycerin and linseed oil are heated to 450°F. with good agitation and held for 15 to 45 minutes. After 15 minutes the acid number is reduced to about 40 and longer heating further reduces the acid number. The temperature is then dropped to 400° F. and the maleic anhydride is added. This material may then be cooked further in order to obtain suitable body, or if desired the reaction may be stopped after the maleic anhydride has been added. The acid number of this product was 34.

Example 2

| | Grams |
|---|---|
| Soya oil fatty acids | 316 |
| 95% glycerin | 110 |
| China-wood oil | 300 |
| Maleic anhydride | 106 |

The soya fatty acids, glycerin and China-wood oil are heated together to 450° F. in an atmosphere of carbon dioxide and with good mechanical agitation. This temperature is maintained for about one hour and then dropped to 350° F., the maleic anhydride is then added and the temperature is raised to 350° F. and held for one hour.

Example 3

| | Grams |
|---|---|
| Linseed oil fatty acids | 632 |
| 95% glycerin | 220 |
| Soya bean oil | 600 |
| Maleic anhydride | 212 |

The oil, oil acids and glycerin are heated together with good agitation to 450° F., and held for 15 minutes. The temperature is then dropped to about 400° F., and the maleic anhydride is added. After all the maleic anhydride is in, the temperature is raised to 450° F., and the material is cooled.

Example 4

| | Grams |
|---|---|
| Linseed oil fatty acids | 316 |
| 95% glycerin | 110 |
| Soya bean oil | 300 |
| Maleic anhydride | 106 |

The oil, oil acids and glycerin are heated to 390° F., and held at this temperature until the acid number is reduced to 40 or below, in this particular case to 36.8. This acid number indicates that the reaction between the fatty acid and glycerin was approximately 57.5% complete. The maleic anhydride is added to the batch gradually with continuous mechanical agitation. The oil is then cooled and stored for further use.

Example 5

| | Parts |
|---|---|
| Linseed fatty acids | 303 |
| 95% glycerin | 106 |
| Linseed oil A. N. 1.2 | 288 |
| Maleic anhydride | 102 |

The first three ingredients were heated to 400° F., and then held at this temperature until the acid number was 20–25, the heating being with agitation and under carbon dioxide. The maelic anhydride was then added slowly, after which the oil was cooled. The acid number of 20–25 indicated that the reaction between the free fatty acids and glycerin was 71.5 to 77% complete.

The foregoing examples are to be considered illustrative and it will be understood that variations thereof may be employed. The times and temperatures are not so important, provided the acid number of the ternary mixture is reduced to such a value that at least about a 54% reaction is indicated between the free fatty acids and the glycerin. The actual temperatures will ordinarily be those customarily employed which, as indicated by the examples, are in the range of 390 to 450° F. The time is variable and depends upon the particular oils and acids used, the size of the batch, the degree to which the reaction is carried, etc. The amount of oil may, of course, be varied and, of course, with larger amounts the acid number of the ternary product will be lower for the same degree of reaction.

This application is a continuation in part of application Serial Number 418,385, filed November 8, 1941, now abandoned.

Having described the invention, what is claimed is:

1. The process which consists in heating together with agitation, equimolecular proportions of glycerine and fatty acids selected from the class consisting of drying oil and semi-drying oil fatty acids dispersed in glyceride oil selected from the class consisting of drying oils and semi-drying oils until the reaction between the glycerin and free fatty acids is at least 54% complete as shown by the acid number, and then gradually adding maleic anhydride to the reaction mixture in an equimolecular quantity to the glycerin employed.

2. The process of claim 1, in which the glycerin, fatty acids and glyceride oil mixture is heated at 390–450° C.

3. The process which consists in heating together with agitation, equimolecular proportions of glycerin and fatty acids selected from the class consisting of drying and semi-drying oil fatty acids dispersed in glyceride oil selected from the class consisting of drying and semi-drying oils in an amount approximately equal to the weight of fatty acids employed until the acid number has been reduced to a value not exceeding 40, and then gradually adding maleic anhydride in an equimolecular quantity to the glycerin.

4. The process of claim 1 in which the mixture is cooled after the maleic anhydride has been added.

5. The process of claim 1 in which the mixture is heated after the maleic anhydride has been added.

CHARLES G. MOORE.

REFERENCES CITED

The following references are of record in the file of this patent:

UNITED STATES PATENTS

| Number | Name | Date |
| --- | --- | --- |
| 1,889,923 | Kienle | Dec. 6, 1932 |
| 2,039,243 | Krzikalla et al. | Apr. 28, 1936 |
| 2,063,854 | Rosenblum | Dec. 8, 1936 |
| 2,063,855 | Rosenblum | Dec. 8, 1936 |

OTHER REFERENCES

Textbook of Organic Chemistry, E. Wertheim, 2d ed., 1945, pp. 262–263.